UNITED STATES PATENT OFFICE 2,019,914

WATER-INSOLUBLE AZO-DYESTUFFS AND FIBER DYED THEREWITH

Herbert Kracker, Frankfort-on-the-Main-Höchst, Germany, assignor to General Aniline Works, Inc., New York, N. Y., a corporation of Delaware No Drawing. Application January 11, 1935, Serial No. 1,439. In Germany January 19, 1934

8 Claims. (Cl. 260—95)

The present invention relates to water-insoluble azo-dyestuffs and to fiber dyed therewith; more particularly it relates to dyestuffs of the following general formula:

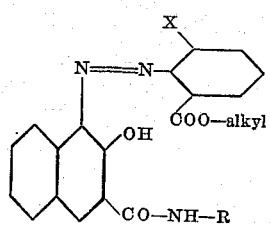

wherein X stands for halogen and R represents a radical of the benzene or naphthalene series.

I have found that dyestuffs which, in general, have good fastness properties and, in part, a very good fastness to light may be obtained by combining diazotized 1-amino-2-halogenbenzene-6-carboxylic acid-alkyl-esters of the formula

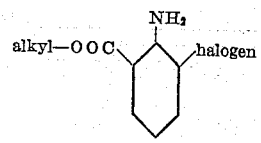

with combining components containing a hydroxy group, in which the azo group enters the position adjacent to the hydroxy group and which do not contain further solubilizing groups, such as, for instance, the sulfonic acid or carboxylic acid group. As combining components of the aforesaid kind there may be mentioned, for instance: β-naphthol, derivatives of pyrazolones, arylides of 2,3-hydroxynaphthoic acid, of 2-hydroxycarbazole-3-carboxylic acid, of 2-hydroxy-benzocarbazole-3-carboxylic acids, of acyl-acetic acids, of aroylene-bis-acetic acids and the like.

The said dyestuffs may be prepared in the usual manner, either in substance, or on the fiber by dyeing or printing or on any other substratum which is adapted for the preparation of lakes.

They have a better fastness to light and to boiling sodium carbonate solution than the analogous dyestuffs obtainable according to U. S. Patents No. 1,785,846 and No. 1,914,427 by combining diazotized 1-aminobenzene-2-carboxylic acid esters which contain further substituents in the nucleus, with arylides of 2,3-hydroxynaphthoic acid.

The following examples serve to illustrate the invention but they are not intended to limit it thereto:

Dyeing prescription

In the following Examples 1 and 2, 50 grams of well boiled cotton yarn are treated for half-an-hour with the grounding liquor, squeezed, well freed from water by centrifuging or wringing and developed for half-an-hour in the dye-bath. The dyed yarn is then rinsed several times, soaped at boiling temperature and rinsed again.

(1) (a) Grounding liquor

A paste is prepared from 6 grams of 1-(2',3'-hydroxy naphthoylamino)-2-methyl-4-methoxybenzene, 10 cc. of sodium Turkey red oil of 50% strength and 10 cc. of caustic soda solution (specific gravity 1.308); 750 cc. of hot water are added to the paste which is dissolved by boiling. The whole is allowed to cool, 6 cc. of formaldehyde solution of 30% strength are added and the whole is made up to 1000 cc.

(b) Dye-bath 1.86 grams of 1-amino-2-chlorobenzene-6-carboxylic acid-methyl-ester are diazotized with 3 cc. of hydrochloric acid (specific gravity 1.180) and 0.69 gram of sodium nitrite with addition of ice. The clear diazo solution is rendered neutral to Congo paper with about 2 grs. of crystallized sodium acetate; 30 grams of sodium chloride are then added and the whole is made up to 1000 cc.

An orange dyeing of a very good fastness to light is obtained.

The dyestuff corresponds to the following formula:

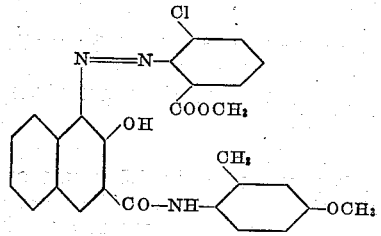

(2) (a) Grounding liquor

The grounding liquor is prepared as described in Example 1 by using, however, 6 grams of 1-(2',3'-hydroxy-naphthoylamino)-4-methoxybenzene.

(b) Dye-bath

The dye-bath is the same as described in Example 1.

A red dyeing of very good fastness to light is obtained.

(3)

31.2 grams of 1-(2',3'-hydroxy-naphthoylamino)-2-methyl-5-chlorobenzene are dissolved, while boiling, in 125 cc. of 2-N-caustic soda solution and 250 cc. of water, the whole is diluted with water to 1000 cc. and precipitated in a finely divided form by addition of 125 cc. of 2-N-acetic acid.

Furthermore, 20 grams of 1-amino-2-chlorobenzene-6-carboxylic acid-ethyl-ester are diazotized at a temperature of 0° C. to 5° C. with 30 cc. of hydrochloric acid (specific gravity 1.180) and 6.9 grams of sodium nitrite, and the clear diazo solution obtained is rendered neutral to Congo paper by means of sodium acetate.

This diazo solution is run into the above prepared suspension. When the formation of the dyestuff is finished, it is filtered by suction and washed well with water.

The dyestuff forms a scarlet paste of very good fastness to light.

(4)

A paste is prepared from 3.5 grams of 2-hydroxy-carbazole-3-carboxylic acid-para-chloranilide, 10 cc. of sodium Turkey red oil of 50% strength and 5 cc. of caustic soda solution (specific gravity 1.308) and dissolved by pouring boiling water on it; the whole is then diluted to 1000 cc.

Cotton fabric is padded on a foulard with this solution and the grounded fabric is dried.

Furthermore, 9.3 grams of 1-amino-2-chlorobenzene-6-carboxylic acid-methyl-ester are diazotized with 15 cc. of hydrochloric acid (specific gravity 1.180) and 3.5 grams of sodium nitrite, with addition of ice; the clear diazo solution is rendered neutral to Congo paper by means of sodium acetate and made up with water to 520 cc. The whole is then thickened with 480 grams of a tragacanth thickening 60:1000.

The padded cotton fabric is printed with this diazo-printing color, rinsed and soaped at boiling temperature.

A brown print of very good fastness to light is obtained.

By using other coupling and diazotizing components, falling within the scope of this invention, dyestuffs are obtained in a similar manner which have in part about the same fastness to light as the dyestuffs described in the foregoing examples. The following table illustrates a further number of azo-dyestuffs which are obtainable according to the present invention:

| | Diazotizing component | Coupling component | Shade |
|---|---|---|---|
| 1. | 1-amino-2-chlorobenzene-6-carboxylic acid-methyl-ester | 1-(2',3'-hydroxy-napthoylamino)-4-chlorobenzene | Scarlet. |
| 2. | Do | 1-(2',3'-hydroxy-naphthoylamino)-4-methylbenzene | Do. |
| 3. | Do | 1-(2',3'-hydroxy-naphthoylamino)-2-methyl-4-chlorobenzene. | Do. |
| 4. | Do | 2-(2',3'-hydroxy-naphthoylamino)-naphthalene | Red. |
| 5. | Do | 1-(2',3'-hydroxy-naphthoylamino)-4-chloro-2,5-dimethoxy-benzene. | Orange. |
| 6. | Do | 1-(2',3'-hydroxy-naphthoylamino)-2,5-dimethoxy-benzene. | Yellowish-red. |
| 7. | Do | di-acetacetic acid-4,4'-diamino-3,3'dimethyl-diphenyl | Yellow. |
| 8. | Do | 2-hydroxyanthracene-3-carboxylic acid-ortho-toluidine | Bluish-red. |
| 9. | Do | 5'-hydroxy-benzo (1,2,1',2')-carbazole-4'-carboxylic acid-para-anisidide of the formula: | Currant. |
| 10. | Do | terephthaloyl-bis-acetic acid-1-amino-3-chloro-4, 6-dimethoxybenzene. | Reddish-yellow. |
| 11. | Do | terephthaloyl-bis-acetic acid-1-amino-4-chloro-2-methoxy-5-methylbenzene. | Middle yellow. |
| 12. | Do | beta-naphthol | Yellowish-red. |
| 13. | Do | 1-phenyl-3-methyl-5-pyrazolone | Yellow. |
| 14. | Do | acetoacetic acid-ortho-chloroanilide | Do. |
| 15. | 1-amino-2-chloro-benzene-6-carboxylic acid-ethyl-ester. | 1-(2',3'-hydroxy naphthoylamino)-4-chlorobenzene | Scarlet. |
| 16. | Do | 2-hydroxycarbazole-3-carboxylic acid-para-chloroanilide | Brown. |
| 17. | Do | 1-(2',3'-hydroxy naphthoylamino)-2-methyl-4-chlorobenzene. | Scarlet. |
| 18. | 1-amino-2-bromo-benzene-6-carboxylic acid-methyl-ester. | 1-(2,3'-hydroxy-naphthoylamino)-4-methylbenzene | Do. |
| 19. | Do | 1-(2',3'-hydroxy-naphthoylamino)-2-methoxybenzene | Red. |
| 20. | Do | 1-(2',3'-hydroxy-naphthoylamino)-2-methyl-4-methoxy-benzene. | Orange. |
| 21. | 1-amino-2-bromobenzene-6-carboxylic acid-ethyl-ester | 1-(2',3'-hydroxy-naphthoylamino)-4-chloro-2,5-dimethoxy-benzene. | Do. |
| 22. | Do | 1-(2',3'-hydroxy-naphthoylamino)-4-methoxybenzene | Red. |
| 23. | Do | 2-(2',3'-hydroxy-naphthoylamino)-naphthalene | Do. |

I claim:
1. The water-insoluble azo-dyestuffs of the following general formula:

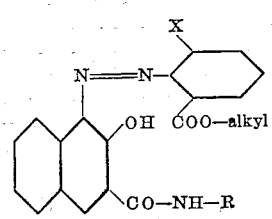

wherein X stands for halogen and R represents a radical of the benzene or naphthalene series, yielding, when produced on the fiber, orange to red shades of good fastness properties, particularly of very good fastness to light.

2. The water-insoluble azo-dyestuff of the following formula:

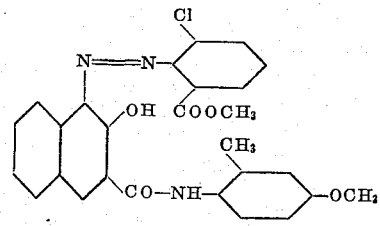

yielding, when produced on the fiber, an orange shade of good fastness properties, particularly of very good fastness to light.

3. The water-insoluble azo-dyestuff of the following formula:

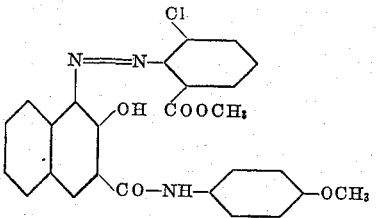

yielding, when produced on the fiber, a red shade of good fastness properties, particularly of very good fastness to light.

4. The water-insoluble azo-dyestuff of the following formula:

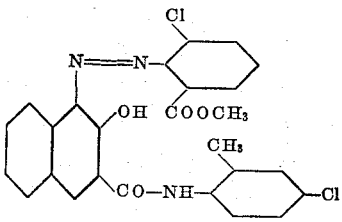

yielding, when produced on the fiber, a scarlet shade of good fastness properties, particularly of very good fastness to light.

5. Fiber dyed with the azo-dyestuffs as claimed in claim 1.

6. Fiber dyed with the azo-dyestuff as claimed in claim 2.

7. Fiber dyed with the azo-dyestuff as claimed in claim 3.

8. Fiber dyed with the azo-dyestuff as claimed in claim 4.

HERBERT KRACKER.